July 14, 1936.  O. N. TEVANDER  2,047,911
BOTTLE CAPPING MACHINE
Original Filed Aug. 4, 1933  15 Sheets-Sheet 2
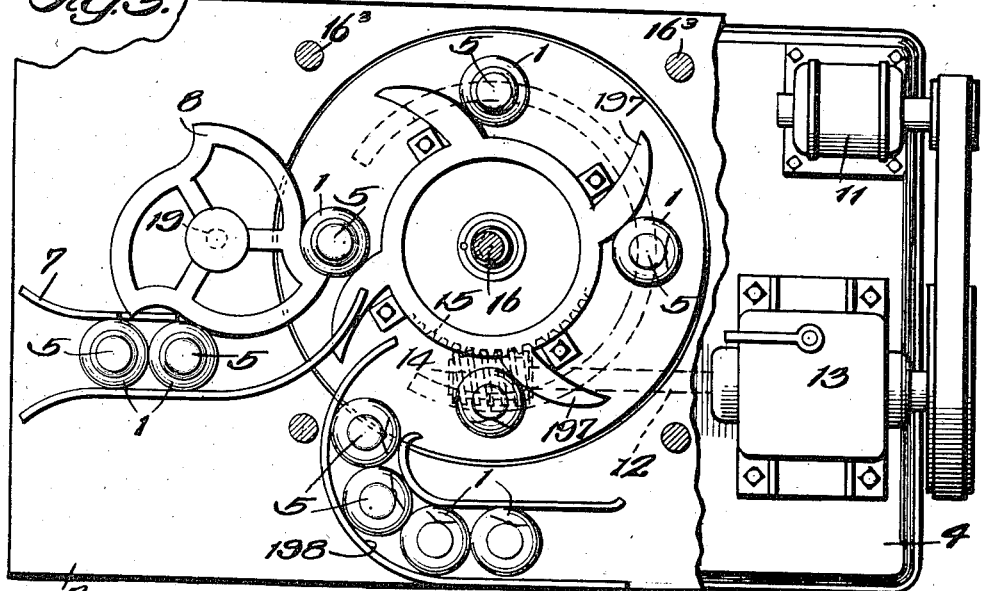
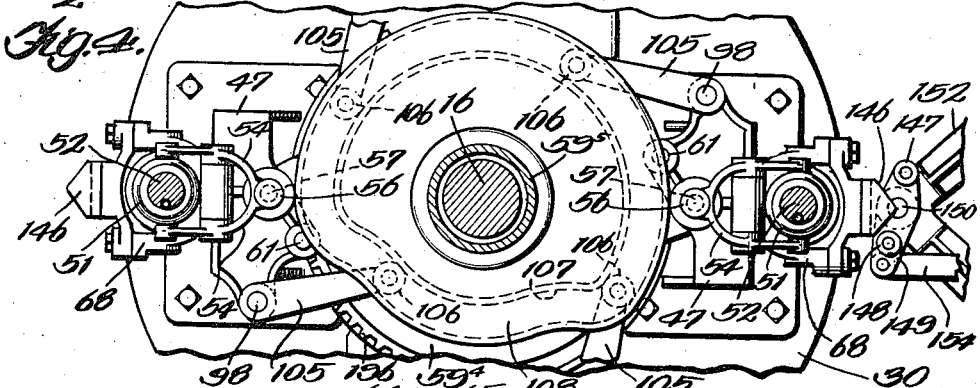
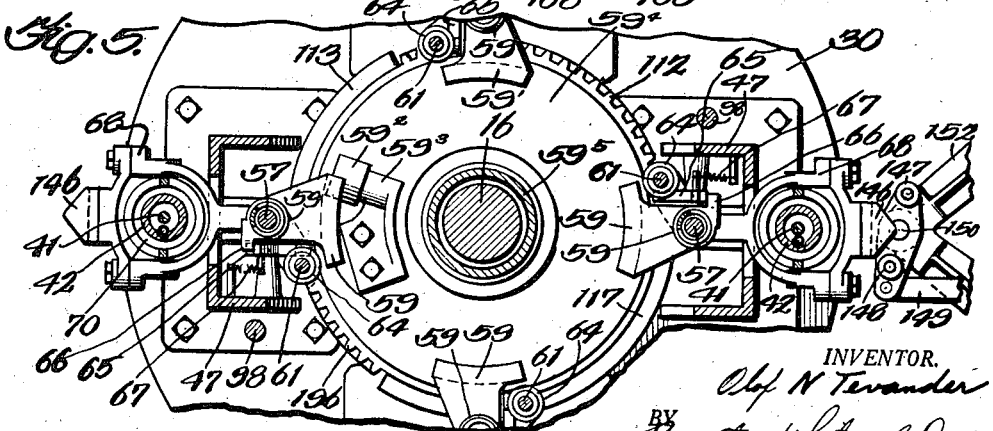
INVENTOR.
Olof N Tevander
BY Braselton Whitcomb Davies
ATTORNEYS.

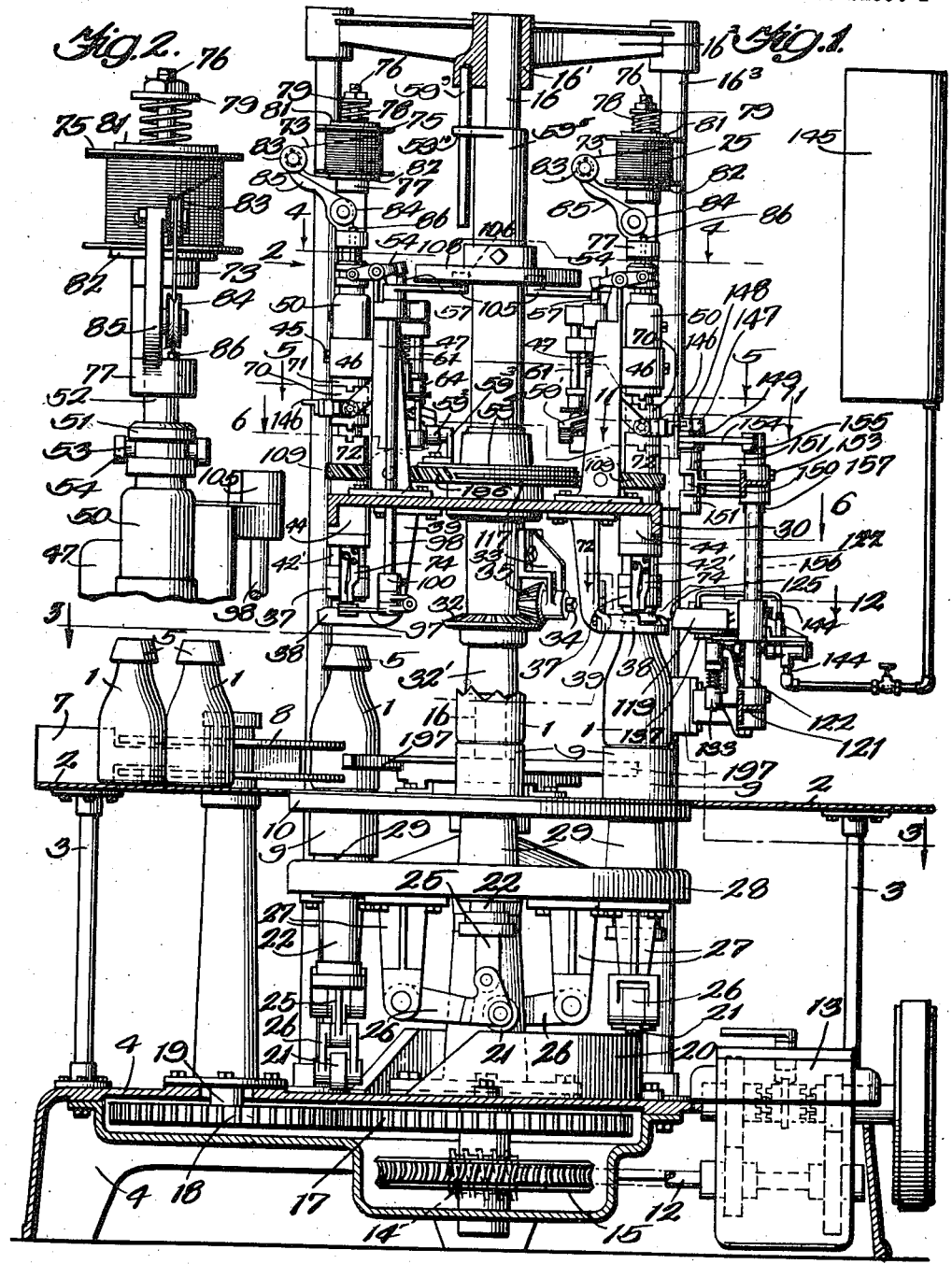

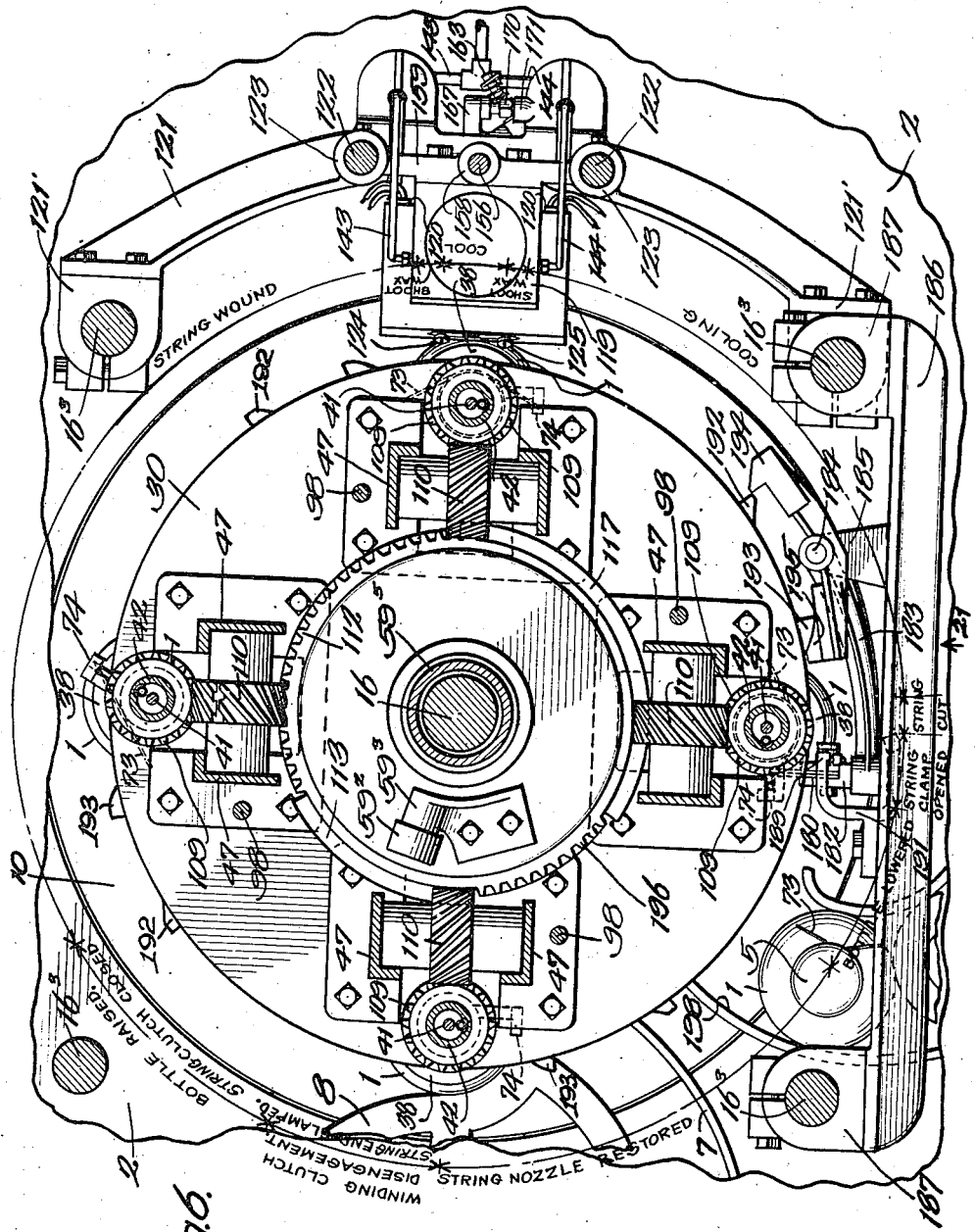

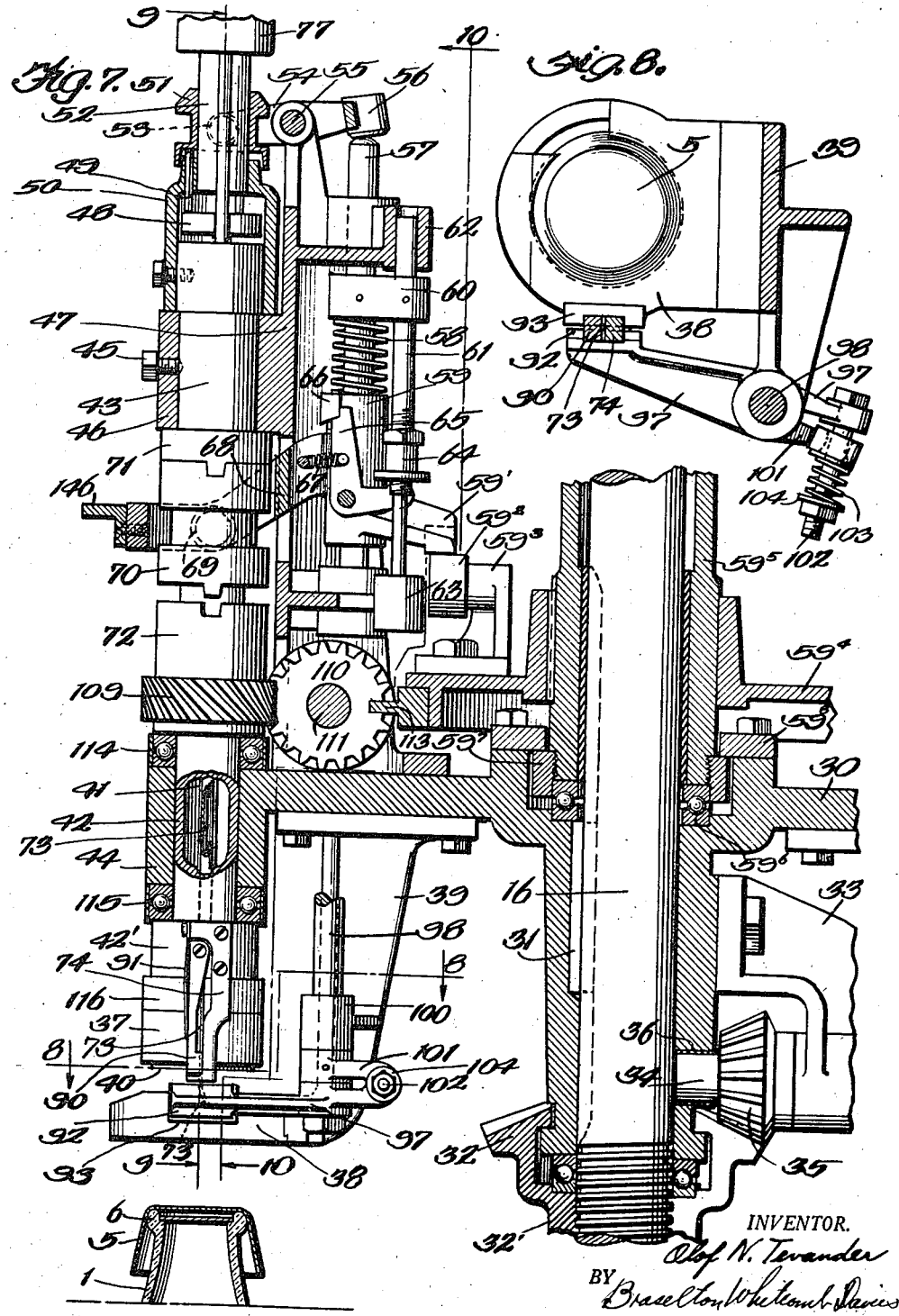

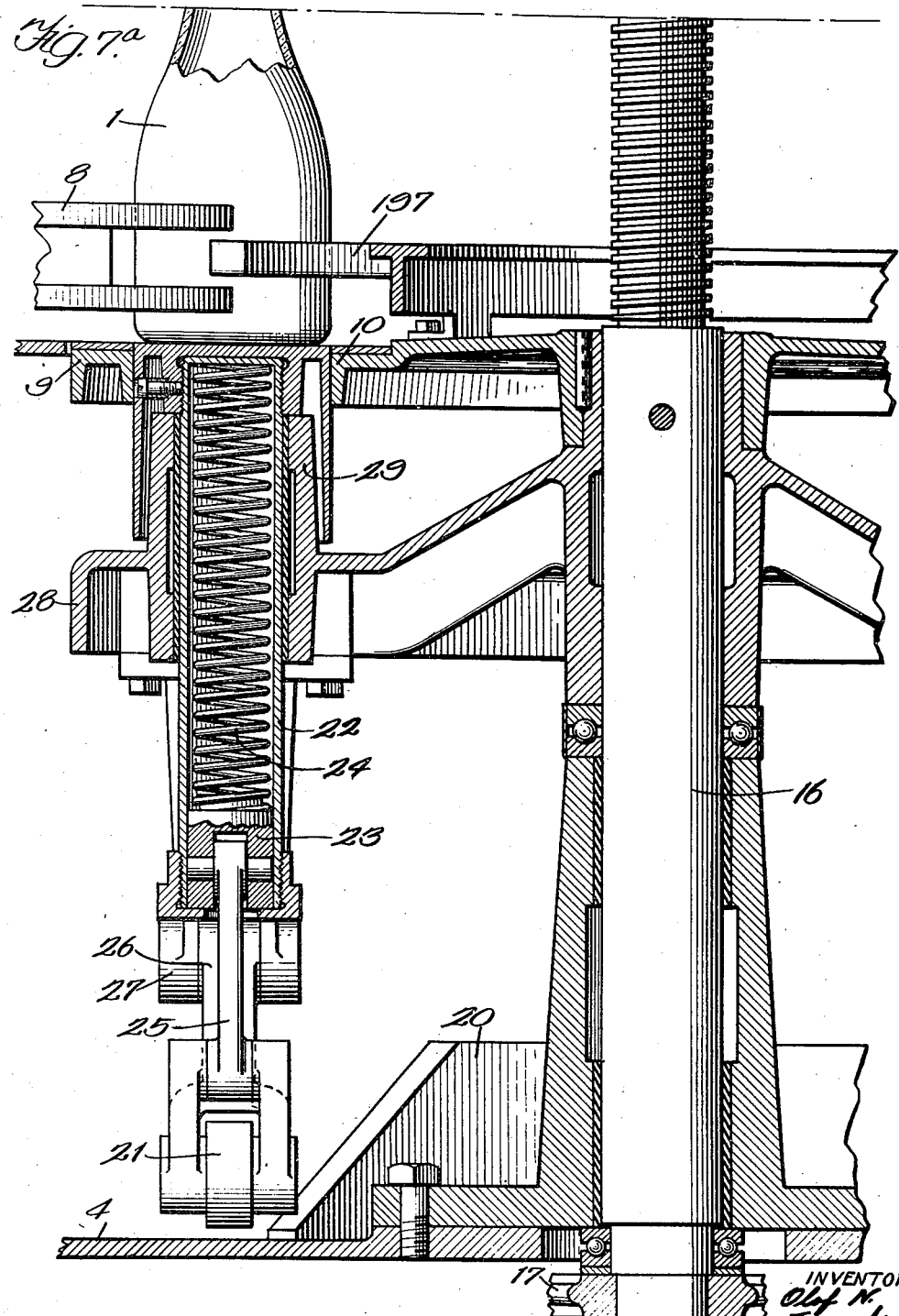

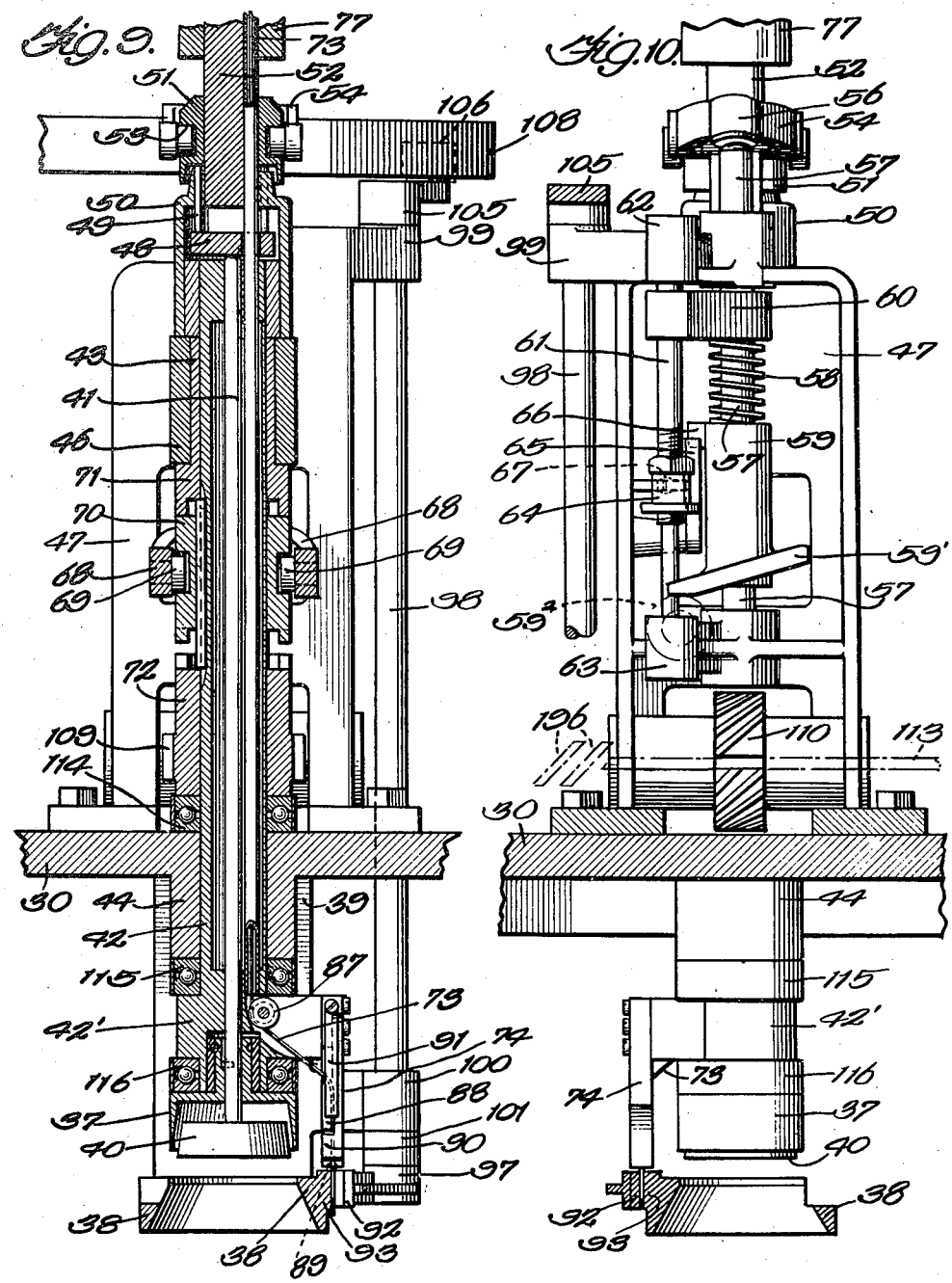

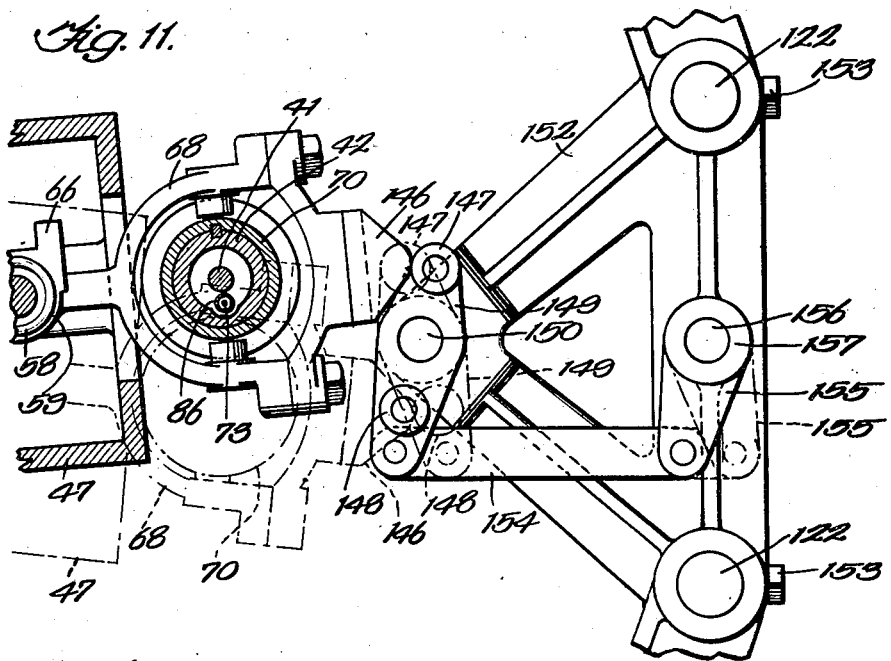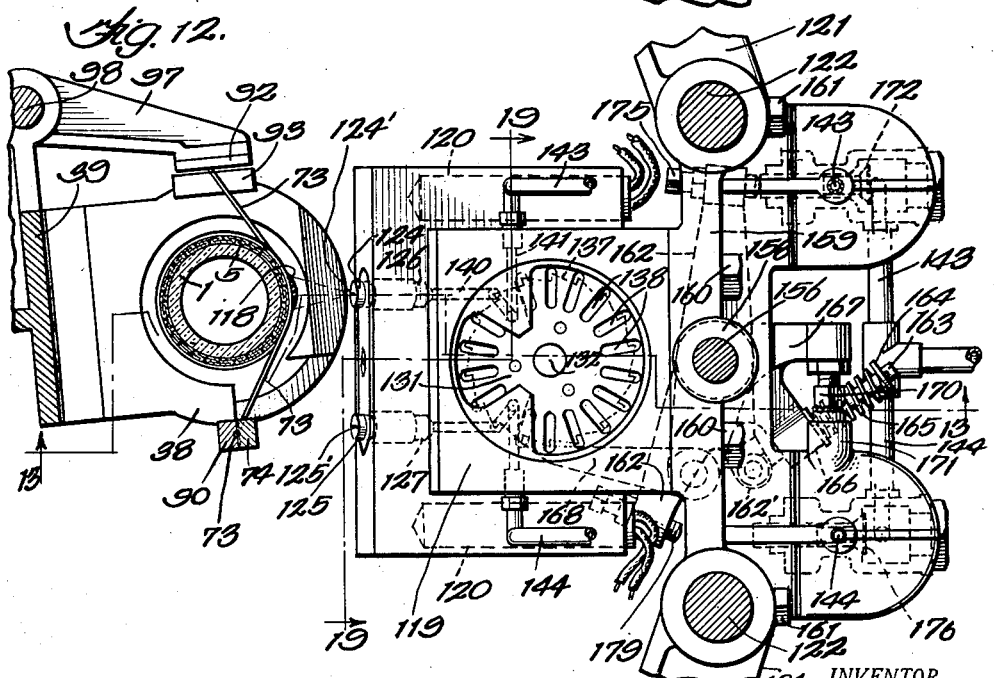

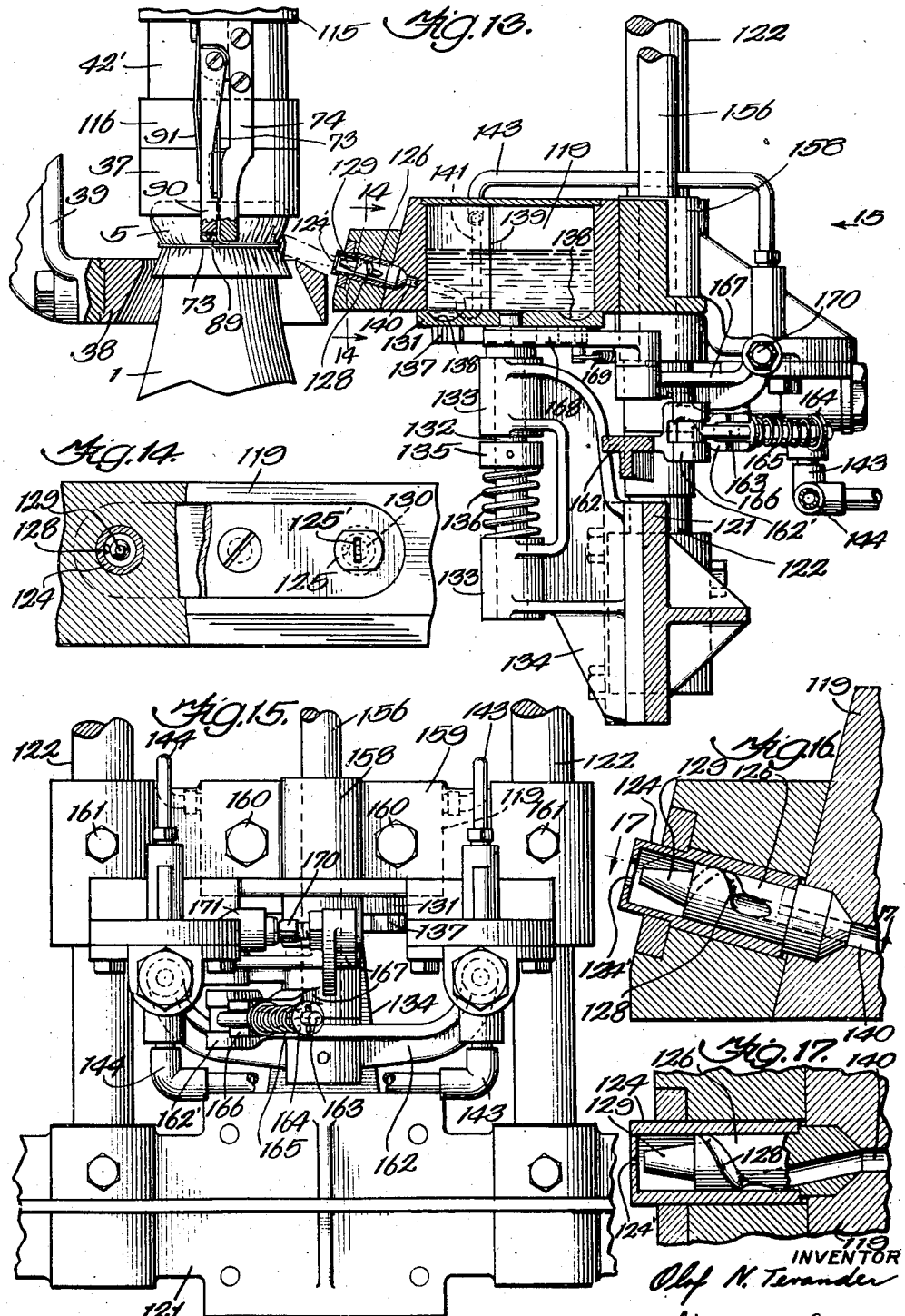

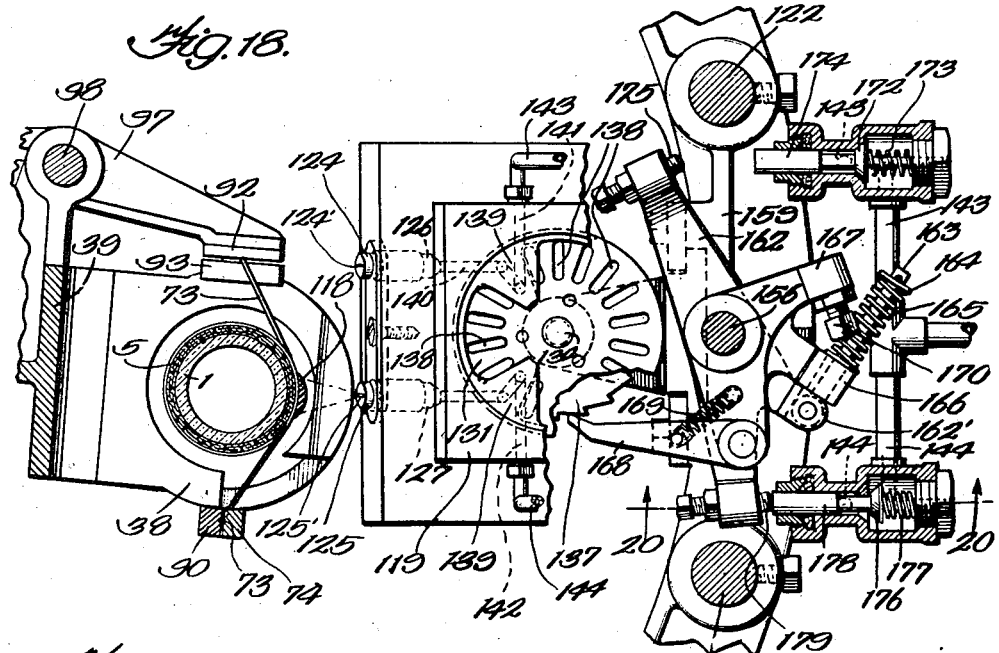
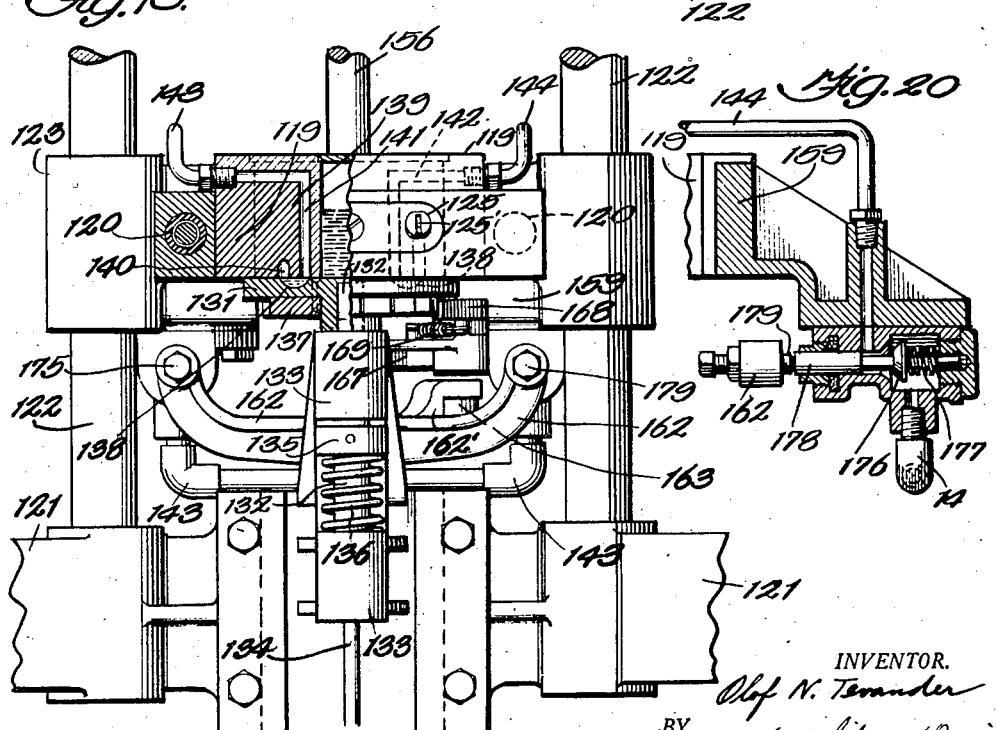

July 14, 1936.   O. N. TEVANDER   2,047,911
BOTTLE CAPPING MACHINE
Original Filed Aug. 4, 1933   15 Sheets-Sheet 10
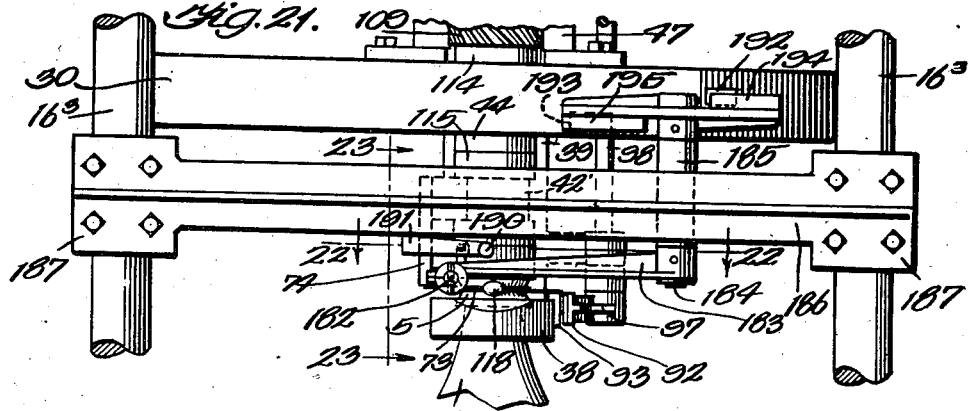
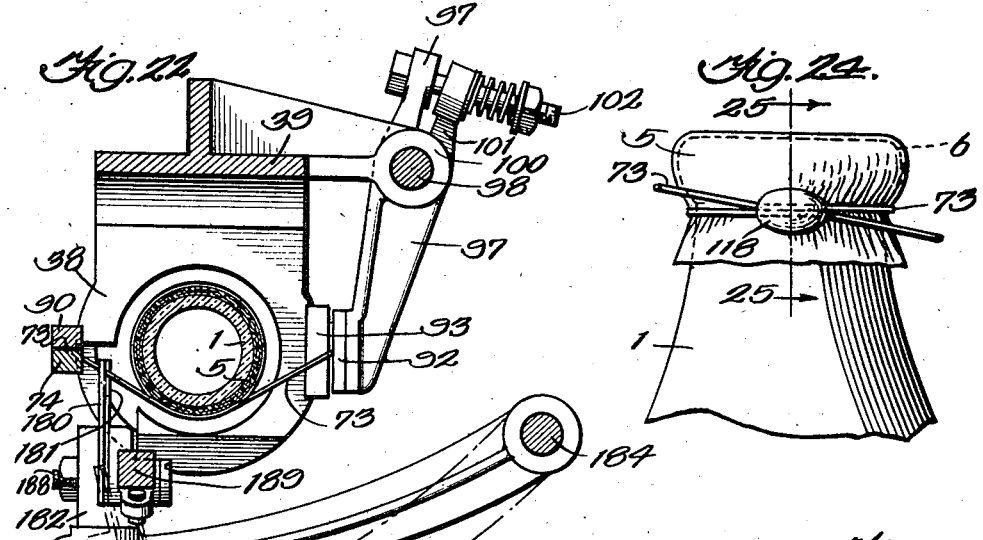
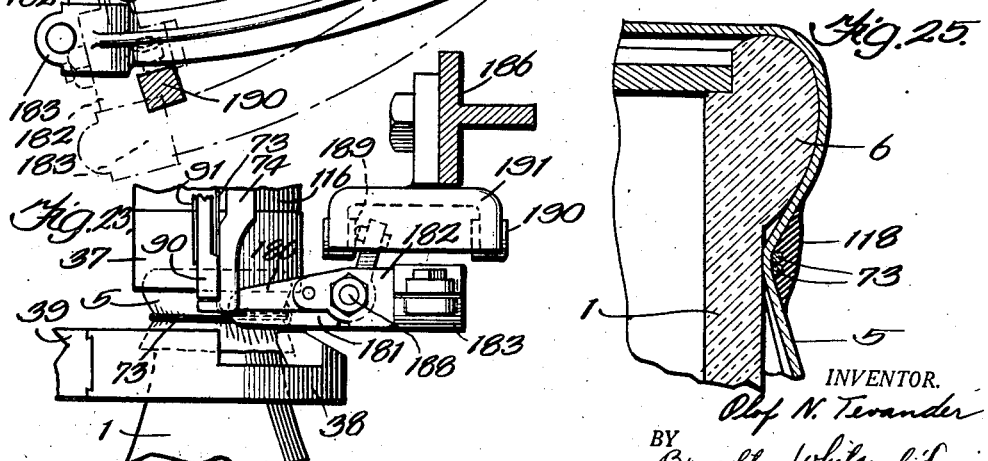
INVENTOR.
Olof N. Tevander
BY
Braselton Whitcomb & Davies
ATTORNEYS

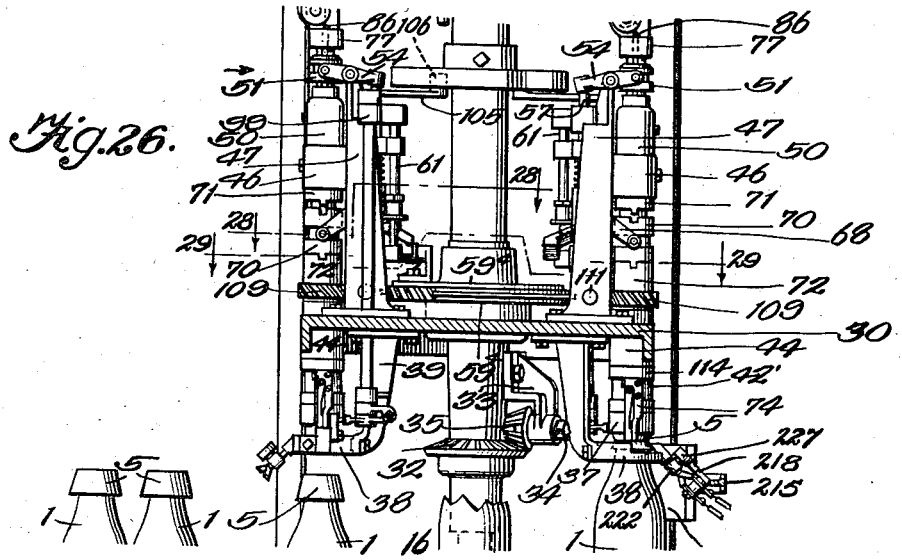
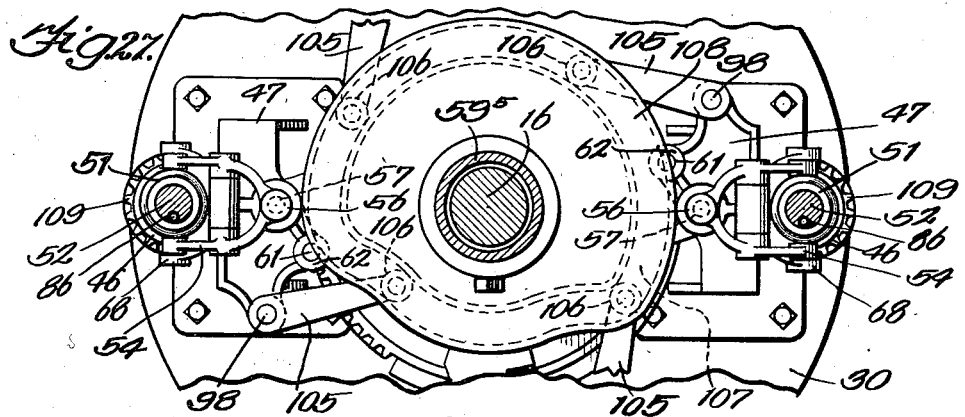
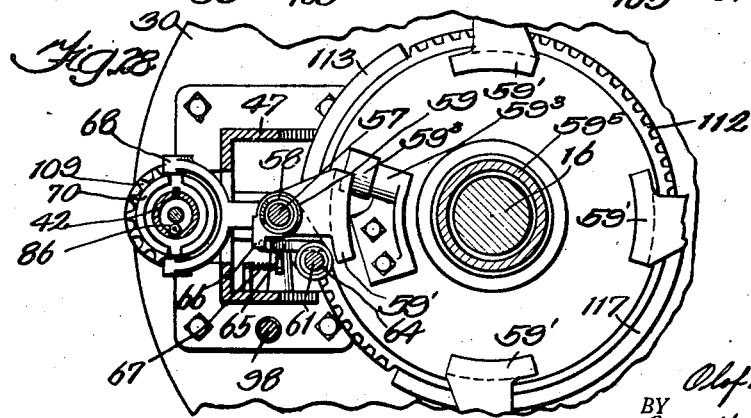

July 14, 1936.  O. N. TEVANDER  2,047,911

BOTTLE CAPPING MACHINE

Original Filed Aug. 4, 1933   15 Sheets-Sheet 12

INVENTOR
Olof N. Tevander
BY Braselton, Whitcomb Davies
ATTORNEYS

July 14, 1936.  O. N. TEVANDER  2,047,911

BOTTLE CAPPING MACHINE

Original Filed Aug. 4, 1933  15 Sheets-Sheet 13

INVENTOR.
Olof N. Tevander
BY
Braselton Whitcomb Davies
ATTORNEYS.

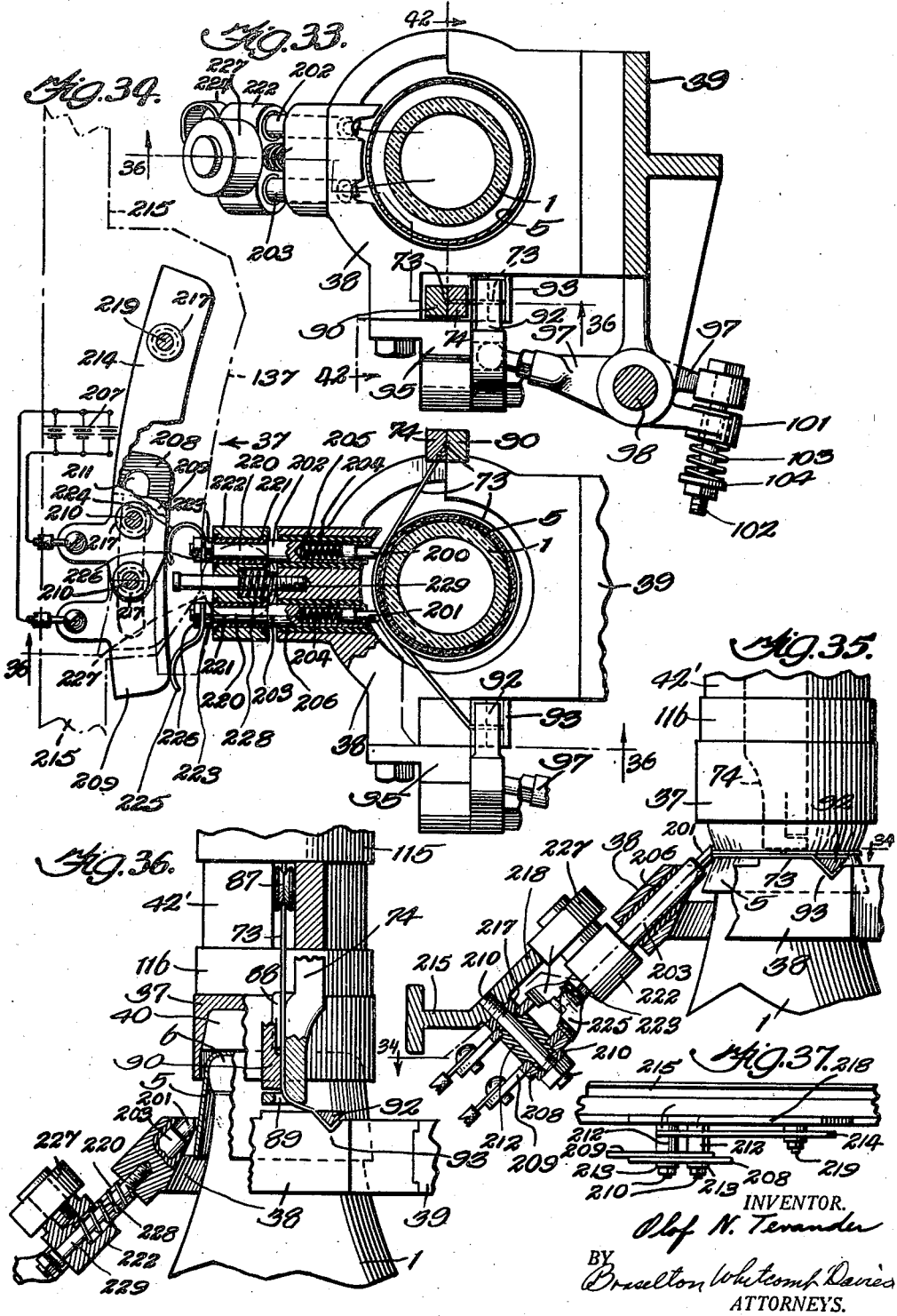

July 14, 1936.   O. N. TEVANDER   2,047,911
BOTTLE CAPPING MACHINE
Original Filed Aug. 4, 1933   15 Sheets-Sheet 15
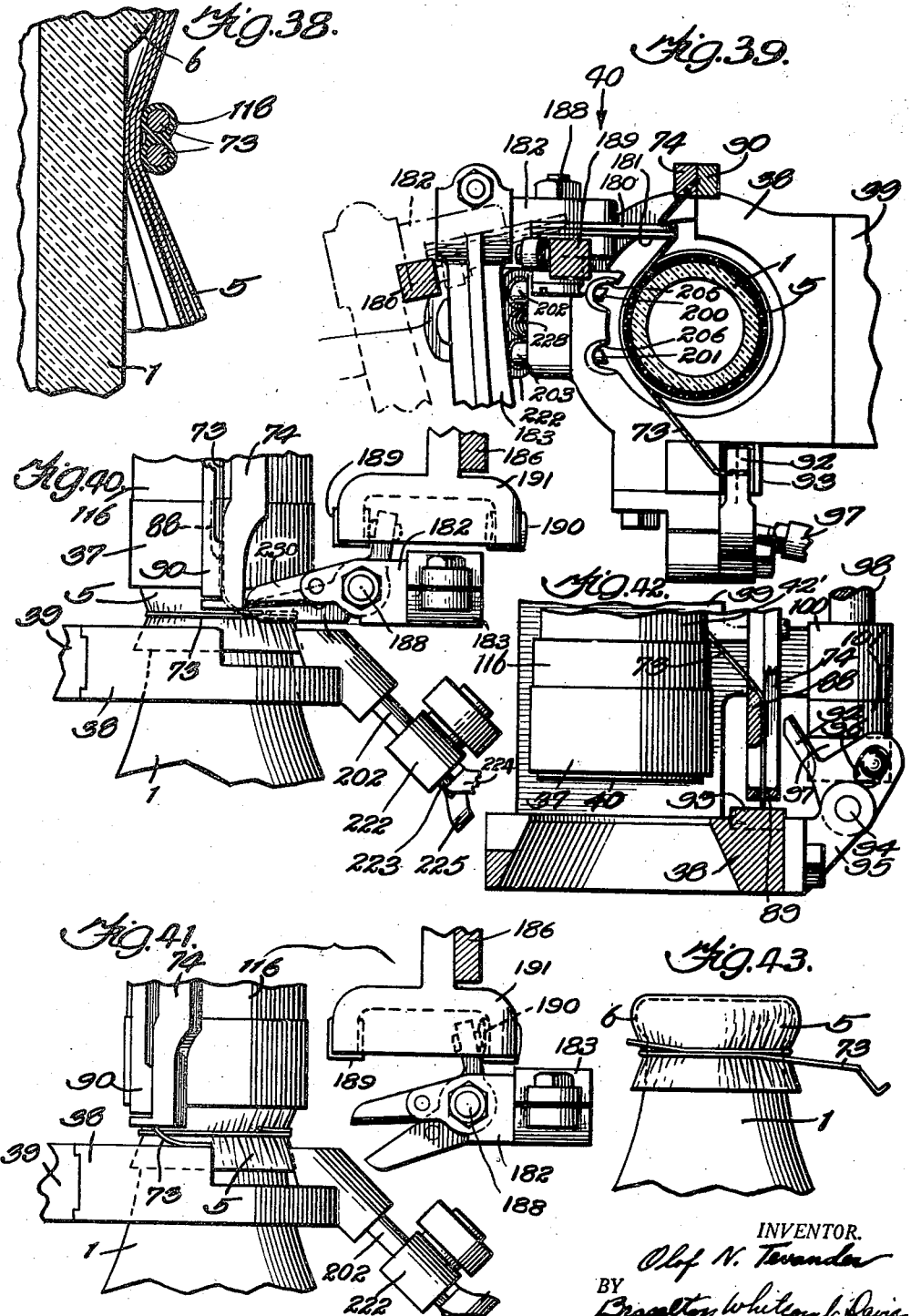
INVENTOR.
Olof N. Tevander
BY
Bralton Whiteomb Davis
ATTORNEYS.

Patented July 14, 1936

2,047,911

UNITED STATES PATENT OFFICE 2,047,911

BOTTLE CAPPING MACHINE

Olof N. Tevander, Chicago, Ill., assignor to Standard Cap and Seal Corporation, Chicago, Ill., a corporation of Virginia Original application August 4, 1933, Serial No. 683,649. Divided and this application May 5, 1936, Serial No. 78,015

6 Claims. (Cl. 226—80)

This invention relates to a machine involving the combination of means to move bottles, each bottle adapted to have a contractible skirted cap located thereon, said caps adapted to be sealed on the bottle; a source of supply of strand material; simultaneously operating mechanisms for sealing said caps to the bottles, each of said mechanisms including a strand feeding device, mechanism to seal the cap to the bottle by said strand material, said mechanism being ineffective in the absence of a bottle from the corresponding bottle positioning mechanism; and means for causing relative movement between each bottle positioning means and said mechanisms in the operation of said combination.

In carrying out my invention I employ a plurality of positioners for bottles having a skirted closure cap, the mechanism constructed to contract the cap skirt about the neck of the bottle, and mechanism for sealing the cap skirt in contracted condition on the bottle, said positioner and mechanisms being relatively movable into cooperative relation, the mechanism arranged so that the band material will not be withdrawn from the source of supply nor the sealing effected unless a bottle is present on the particular positioner in question.

I have illustrated various embodiments of the machine and mechanisms involving the aforesaid invention and in this connection, the general features of one form of hood sealing mechanism hereinafter more fully explained is first illustrated in Figures 1 to 26, in which:

Fig. 1 is an elevation of one form of the hood sealing mechanism of this machine, parts being shown in section.

Fig. 2 is a view of a part of the mechanism shown in Fig. 1 in the direction of arrow 2;

Fig. 3 is a view on line 3—3 of Fig. 1;

Fig. 4 is a view on line 4—4 of Fig. 1;

Fig. 5 is a view on line 5—5 of Fig. 1;

Fig. 6 is a view on line 6—6 of Fig. 1;

Figure 29:
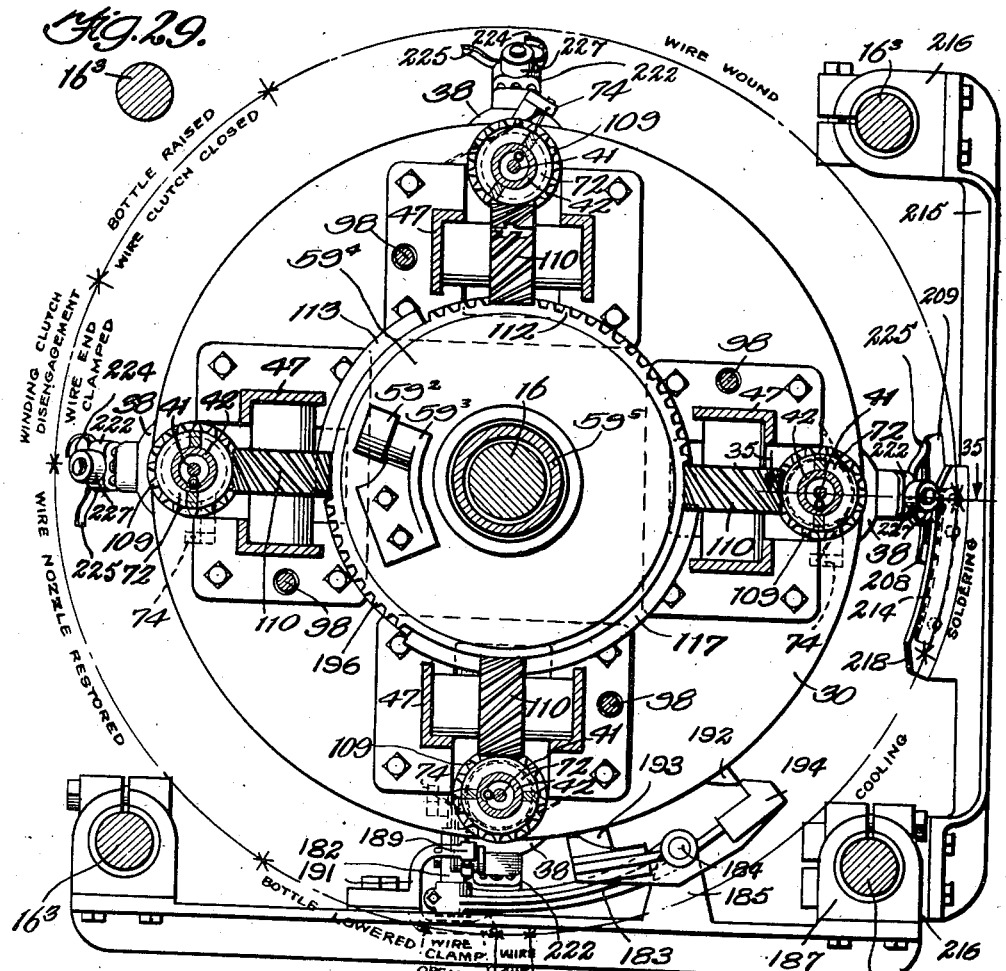
Figure 30:
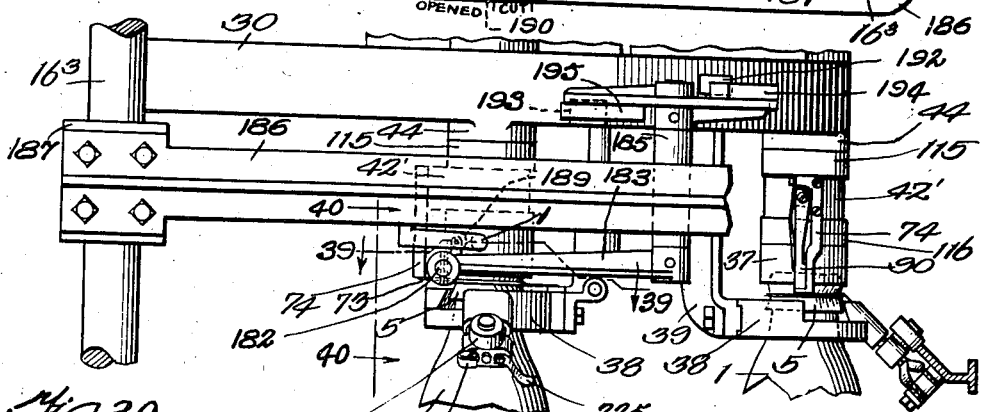
Figure 32:
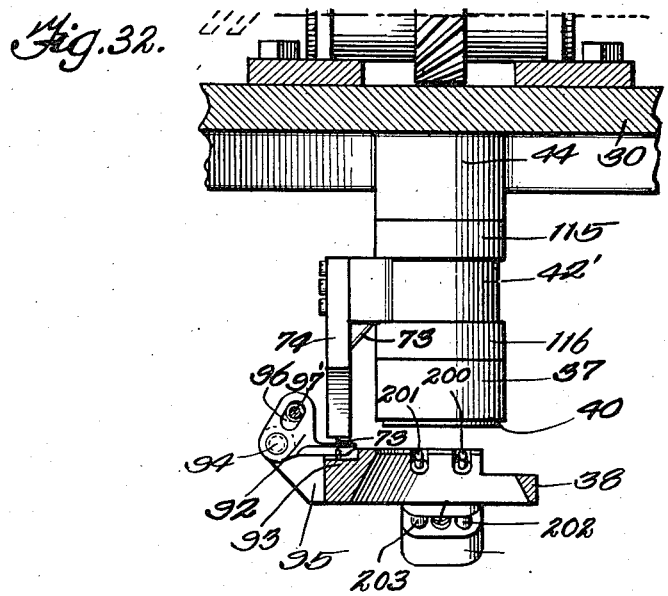
Figure 31:
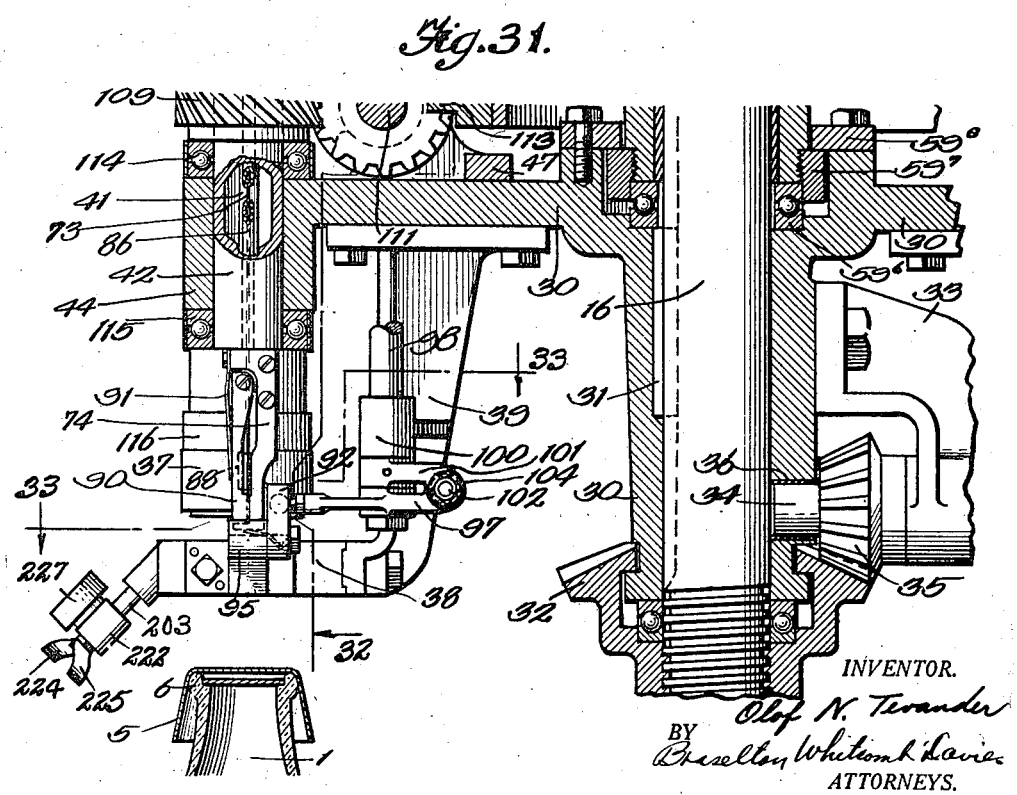

Fig. 7 and Fig. 7a, taken together, illustrate a view in elevation with parts shown in section and parts in full elevation, the bottom of Fig. 7 matching with the top of Fig. 7a;

Fig. 8 is a sectional view on line 8—8 of Fig. 7;

Fig. 9 is a sectional view on line 9—9 of Fig. 7;

Fig. 10 is a sectional view on line 10—10 of Fig. 7;

Fig. 11 is a sectional view on line 11—11 of Fig. 1 with parts in changed positions;

Fig. 12 is a view on line 12—12 of Fig. 1 with parts in changed positions;

Fig. 13 is a view on line 13—13 of Fig. 12;

Fig. 14 is a view on line 14—14 of Fig. 13, with parts omitted and some parts shown in full;

Fig. 15 is a view looking in the direction of arrow 15, Fig. 13;

Fig. 16 is an enlargement of a part of Fig. 13;

Fig. 17 is a sectional view on line 17—17 of Fig. 16;

Fig. 18 is a view similar to Fig. 12 with parts omitted, broken away and in changed positions;

Fig. 19 is a view on line 19—19 of Fig. 12;

Fig. 20 is a sectional view on line 20—20 of Fig. 18;

Fig. 21 is a view in elevation in the direction of arrow 21, Fig. 6;

Fig. 22 is a sectional view on line 22—22 of Fig. 21;

Fig. 23 is a sectional view on line 23—23 of Fig. 21;

Fig. 24 is a view in elevation of the upper portion of the bottle illustrating a cap applied to a bottle mouth by a string fastened by the machine of my invention;

Fig. 25 is a sectional view on line 25—25 of Fig. 24;

Fig. 26 is a fragmentary elevation, partly in section, of an embodiment of my invention showing the fastening of a metallic strand by means such as solder;

Fig. 27 is a view on line 27—27 of Fig. 26;

Fig. 28 is a view on line 28—28 of Fig. 26;

Fig. 29 is a view on line 29—29 of Fig. 26;

Fig. 30 is a view in elevation of a part of the mechanism which is shown in Fig. 29;

Fig. 31 illustrates a view in elevation with parts shown in section;

Fig. 32 is a sectional view on line 32—32 of Fig. 31;

Fig. 33 is a sectional view on line 33—33 of Fig. 31 the bottle and the cap skirt being shown in section for clearness in illustration;

Fig. 34 is a view on the line 34—34 of Fig. 35;

Fig. 35 is a view on the line 35—35 of Fig. 29 with parts omitted;

Fig. 36 is a view on line 36—36 of Fig. 33;

Fig. 37 is a view of a part of the mechanism looking in a direction of arrow 37 of Fig. 34;

Fig. 38 is a sectional view of a part of the bottle illustrating the union between the lapping ends of the string;

Fig. 39 is a sectional view on line 39—39 of Fig. 30;

Fig. 40 is a sectional view on line 40—40 of Fig. 30 and looking in the direction of arrow 40 of Fig. 39;

Fig. 41 is a view similar to Fig. 40 showing parts in changed positions;

Fig. 42 is a sectional view on line 42—42 of Fig. 33 with parts in changed positions;

Fig. 43 is a view in elevation of the upper portion of a bottle with a closure cap as applied thereto by the machine.

Driving mechanism

The bottles 1 are suitably supplied to a stationary deck 2 carried upon posts 3 which are supported by the base 4 of the machine. These bottles have caps 5 initially loosely applied thereto. The skirts of these caps are to be tightened about the bottle necks by the machine of my invention so as to underlie the beads 6 (Fig. 25) about the bottle mouths. The bottles, with the loose caps thereon, are fed through the chute 7 in position to be engaged by the teeth of the star wheel 8 which serve to continue the travel of the bottles as they leave the chute and to direct the same individually onto the vertically adjustable sections or bottle positioners, 9 of a disc-like rotary carrier or table 10, these table sections being the preferred form of bottle positioners.

Any suitable mechanism may be employed for operating the various operating elements that are located above the deck 2. In the embodiment of the invention illustrated, an electric motor 11 may be employed for operating a main drive shaft 12. Power is transmitted to this drive shaft at adjustable speed through the intermediation of any suitable speed changing gearing 13. The shaft 12 has a worm 14 thereon which is in mesh with a worm wheel 15. The worm wheel is fixed upon a shaft 16 on which there are also fixed the spur gear 17 and the table 10. The shaft 16 is journalled at its upper end in a sleeve bearing 16' carried by the spider 16² which is mounted upon the upper ends of the rods 16³ that are secured at their lower ends upon the base 4. This spur gear is in mesh with another spur gear 18 that is fixed upon a shaft 19 upon which shaft is also fixed the star wheel 8.

The bottle supporting table 10 is constantly turned and while turning, the sections 9 thereof are gradually elevated from the plane, proper, of the table and gradually restored to this plane, the final capping operation that is to be described occurring when said table sections are in their upper limits of their movements.

I provide a stationary cam track 20 upon which cam rollers 21 travel, to rise and fall. Each table section 9 is assembled with a cam roller so as to rise and fall therewith. As illustrated, each table section 9 is carried at the upper end of a spring barrel 22. A piston 23 is within the lower end of the spring barrel and is normally held in fixed relation therewith by means of a spring 24 which abuts at its lower end upon the piston and at its upper end against the top end wall of the spring barrel. A link 25 connects each piston 23 with one end of a bell crank 26 upon whose elbow the corresponding cam roller is journaled. The other end of this bell crank is pivoted upon arm 27 depending from a bearing support 28 which is fixed upon the shaft 16 and is located below the table 10.

As the shaft 16 turns, the cam rollers move bodily therewith over the cam track 20 to elevate and lower the table sections 9 to enable these table sections to function. As the shaft 16 and the parts thereon turn, the spring barrels 22 rise and fall due to the normally fixed relation of the piston 23 therewith. These spring barrels are guided in their movement by bearings 29 in the bearing support 28. If, in the final capping operation, the bottles should encounter undue strain, the springs 24 will yield to prevent the bottles from breaking, the pistons 23 then rising in the spring barrels.

A support 30 is in normally fixed relation with the shaft 16. This support has splined connection with the shaft 16 as indicated at 31 whereby it may be permitted movement lengthwise of the shaft. A bevel gear 32 has a nut formation 32' screwed upon the shaft 16 and has tongue and groove connection with the support 30 so that this support may be elevated and lowered along the shaft. A bracket 33 is carried by the support 30 and carries one bearing for the shaft 34 of the bevel pinion 35, the other bearing 36 for this shaft being provided in the support 30. The outer end of the shaft 34 is squared, Fig. 1, so that the bevel pinion 35 may be turned by hand to turn the bevel gear 32 that meshes therewith to turn nut 32' to elevate or lower the support 30. By this means, the chucks 37 which are carried by the support 30 through the intermediation of mechanism to be described, and which are provided to receive the tops of the bottles, may be elevated or lowered to suit the heights of the bottles being operated upon by the machine. Each table section 9 has a chuck 37 individual thereto and in vertical alignment therewith, each such table section and the chuck corresponding thereto cooperating to hold a bottle therebetween. A tapering guide 38 is interposed between each table section 9 and the chuck 37 individual to this table section, the guides being carried by brackets 39 that are carried by the support 30. The guides 38 serve to direct the upper ends of the bottles into the chucks 37 and also to gather the skirts of the caps about the bottle necks preparatory to the application of the tightening rings or bands about such cap skirts, in case these skirts flare too much.

Each cycle of operations occupies one revolution of the shaft 16 and support 30 and commences with the deposit of a bottle upon the table section 9 that is to receive it. After the bottle has been received upon the table section 9 that is to carry it, the table 10 and the table sections 9 turn a few degrees before the particular table section 9, in question, commences to rise to permit of some preparatory mechanical automatically effected adjustments. The bottle, in being raised, has its mouth end brought snugly into the chuck 37 overlying the table section 9 that carries such bottle. The bottle raises a solid plunger 40 which extends into the chuck 37. Each plunger has a stem 41 which is mounted to slide in a sleeve 42 which rotates in vertically aligned bearings 43 and 44. Each bearing 43 is held in place by a set nut 45 which passes through a sleeve 46. This sleeve 46 is an integral part of a bracket 47 which is bolted upon the top side of the support 30. When a plunger 40 is raised by the bottle beneath it, the upper end of the plunger stem 41 lifts the floating disc 48 that is co-axial with the plunger and the plunger stem. The disc 48 carries three upright pins 49 that slide within guiding holes formed in the inturned upper end of the extension 50 of sleeve 42. The upper ends of said pins thereupon lift the collar 51 which is loose upon the shaft 52 which is co-axial with and fixed with respect to the sleeve 42, this shaft being directly fixed upon the upper end of the sleeve extension 50. The groove of the collar 51 receives pins 53 provided upon the yoke lever 54 which is intermediately pivoted upon the shaft 55 that is journaled at the top end of the bracket 47. There is such a lever 54 at each bottle position, each lever constituting a part of a string or wire winding mechanism, there being as many such winding mechanisms as there are bottle positions. The base end of each yoke lever 54 carries an abutment 56 which is pressed upon by an upwardly spring pressed upright pin plunger 57. The spring 58 which presses upwardly upon the pin 57 is bottomed at its lower end upon the sleeve 59 which is slidable upon the pin 57 and presses at its upper end, upon the yoke 60 which is secured to the pin 57 and to the upright rod 61 which is slidable within bearing sleeves 62 and 63 carried by the bracket 47. When the plunger stem 41 is raised, the lever yoke 54 is turned clockwise to depress the pin 57 against the force of the spring 58. When thus depressed, the rod 61 is depressed. The adjustable nut 64 upon the rod 61 thereupon presses, at its lower end, upon one end of the bell crank 65 which is pivoted at its elbow upon the bracket 47. The other end of the bell crank is thereupon withdrawn from engagement with the detaining lug 66 which is provided upon the upper end of the sleeve 59. The bell crank lever 65, which thus functions as a detent normally to hold the sleeve 59 in its upper position, is withdrawn from its detaining position by the downward movement of the rod 61 to permit the spring 58 to depress the sleeve 59. This adjustment of the bell crank lever is effected against the force of the restoring spring 67 which is anchored at one end to the bracket 47.

A yoke 68 is carried by the sleeve 59 and itself carries pins 69 that are received within an annular groove formed in the clutch collar 70 that is splined upon the sleeve 42. Clutch collar 70 is formed with clutching formations upon each end thereof which are respectively complemental to the clutching formations upon the stationary clutch member 71 (constituting an extension of the bearing 43) and the rotatable clutch member 72. When the clutch collar or member 70 is in clutching engagement with stationary clutch member 71, said clutch collar is held from rotation so that the sleeve 42 is not then rotatable. The engagement of the members 70 and 71 is effected during the movement of the table section 9 from the time this table section has received a bottle and until such table section is about to be raised by the cam track 20. To this end, the sleeve 59 carries a cam member 59' which rides upon the roller 59² carried by the bracket 59³ which, in turn, is carried upon the normally stationary gear carrier 59⁴. This gear carrier is supported upon the non-rotating sleeve 59⁵ to which it is keyed, a thrust ball bearing structure 59⁶ intervening between the lower end of the sleeve and the support 30. A ring 59⁷ is screwed upon the lower end of the sleeve and a collar 59⁸ is secured upon the support 30 and overlies the ring to keep the sleeve 59⁵ from rising. This sleeve is held from rotating by means of a pin 59⁹ depending from the bearing 16' and which passes through and is in sliding relation with an arm 59¹⁰ provided upon the sleeve 59⁵. The members 70 and 72 are thus positively separated at the initiation of a cycle and are permitted to be engaged when the corresponding table section 9 rises providing there is a bottle upon this table section. If there is no bottle, the clutch member 70 will be held elevated by the detent lever 65 so that the cycle of operations, which is commenced by the inter-action of the elements 59' and 59², is not completed if the bottle is absent. When the clutch collar or member 70 is moved downwardly into clutching engagement with the clutch member 72, a result which occurs when a bottle lifts the corresponding plunger 40, said clutch collar is turned by said clutch member 72 to turn the sleeve 42. The clutch member 72 which is thus employed to drive the sleeve 42 is turned one and one-half times by the time the support 30 has turned a half of a revolution and is turned a half of a revolution during, approximately, the last one-sixth of the revolution of said support 30, all as will more fully hereinafter appear.

*Sealing element winding mechanism*

The sleeve 42 is provided for winding a strand of string or wire 73 about the skirts of bottle caps. The string is directed upon the skirts by being passed through a nozzle 74 which is carried upon the portion 42' of sleeve 42. The discharge end of the nozzle is located sufficiently away from the axis of the plunger stem 42 as to enable the nozzle, in being revolved around the bottle cap, to suitably apply the strand 73 to the skirt thereof. Each chuck 37, which is individual to each table section 9, has a string winding mechanism individual thereto. Each string winding mechanism has a reel or spool of the strands material 75 which is journaled upon the upright shaft or support 76 that is coaxial with the shaft 52, the shaft 76 being secured to the upper end of a yoke 77 whose lower end is secured to the shaft 52 whereby the two shafts turn together with the sleeve 42. A spring 78 abuts against a washer 79 which is positioned by a nut 80 screwed upon the upper end of the corresponding shaft 76. The lower end of said spring 78 presses down upon the disc 81 that bears against the upper side of the reel 75 to hold the lower side of the reel against the flange 82 of the yoke 77. The reel 75 is thus prevented from turning with respect to the shafts 76 and 52 any faster than it is so turned by the string 73 being withdrawn therefrom. The spring 78 also takes part in adjusting the tension upon the string being wound about the bottle cap, the adjustment of the spring determining the degree of tightness of the winding of the string about such cap. The string 73 is passed from the corresponding reel 75 over the idler pulleys 83, 84 carried by the bracket 85 which is an integral part of the yoke 77. The string, after having left the idler pulley 84, is passed through the upright guide tube 86 which is fixed with respect to the sleeve 42 and which passes through this sleeve and the shaft 52. Said tube is disposed alongside of the axis of rotation of said sleeve and is located between this axis and the nozzle 74. The string, after issuing from the lower end of the tube, passes over the idler pulley 87 which is journaled upon the sleeve 42. The string, after having passed through the pulley 87, passes over the guiding lug 88 carried by the nozzle 74, this lug directing the string through the nozzle outlet opening 89. The string, where it is about to enter the nozzle end 89, is pressed against a side of the nozzle by the block 90 which in turn, is pressed upon by the leaf spring 91.

By mechanism to be presently described, the leading end portion of the string which has passed through the nozzle, is clamped between the members 92 and 93 which constitute an anchorage for this leading end of the string in order that the string may be held, at one end, during the rotation of the nozzle, about the corresponding bottle neck, the string thus remaining clamped while the nozzle turns one and one-half times about the bottle neck. The nozzle and the clamp thus constitute strand holders. The clamping action effected by the members 92, 93 is accomplished at the initiation of a cycle of operations and during the time that the members 59', 59² interact to separate the clutch members 70 and 72. The clamping members 93 is stationary, being desirably part of the stationary tapering guide 38. The clamping member 92 is upon one end of a lever 97 which is intermediately journaled upon a shaft 98 that is itself journaled in bearings 99, 100 carried by the brackets 47 and 39 respectively. An arm 101 is fixed upon the shaft 98. The stem of a bolt 102 passes through the lever 97 and the arm 101 and is surrounded by a spring 103. This spring has one end in engagement with a washer 104 which is adjustable in position by a nut screwed upon the stem of the bolt. The other end of the spring engages the arm 101 and presses the head of the bolt against the lever 97. The spring, when permitted to function, operates through the bolt, lever and arm to apply the clamping member 92 to the spring. One end of a lever arm 105 is secured to the top end of the shaft 98 and carries a cam roller 106 at its other end. This cam roller enters a cam slot 107 formed in a normally stationary cam 108 which is carried by the upper end of the nonrotating sleeve 59⁵. This cam slot is so shaped that the clamping member 92 will be applied just as soon as the cycle of operations is initiated and will remain applied until after the overlapping string ends are waxed or cemented together and the cement or wax is hardened. The string is severed, at the nozzle, just before the clamping member 92 is released, which release occurs upon the arrival of the cam roller 106 at a suitably shaped portion of the cam slot 107 as indicated in Fig. 4. When the nozzle has been turned one and a half times about the bottle neck, the cementing or waxing device is brought into operation, as will later appear.

The gearing for turning the clutch member 72 which turns the sleeve 42 through the intermediation of the clutch members 70 and 72, as hitherto described, is inclusive of a spiral gear 109 fixed upon and coaxial with the clutch member 72, a spiral gear 110 meshing with the gear 109 and fixed upon a shaft 111 which is journaled at its ends in the bracket 47 that bodily rotates with the support 30 carrying it, and the stationary segmental spiral rack 112 which is coaxial with the shaft 16 and which is carried by the normally stationary gear carrier 59⁴. A space intervenes between the entering end of the rack 112 and the gear 110 at the commencement of the cycle of operations so that there will be no rotation of the nozzle 74 while the bottle is being elevated. The gear 110 is positively held from rotation until it enters into mesh with the rack 112 by means of the stationary feather 113 which passes through a radial slot in said gear. Previously to the meshing of the gear 110 with the rack 112, the clutch members 70 and 72 were engaged by the action of the elevated bottle. If there happens to be no bottle in place upon a particular table section 9, the clutch members 70 and 72 will not be coupled so that there will be no rotation at all of the nozzle during the travel of said table section 9 owing to the separation of said clutch members. A thrust ball bearing structure 114 is interposed between the clutch member 72 and the support 30, another thrust ball bearing structure 115 is interposed between the support 30 and the enlargement 42' of the sleeve 42, and a third thrust ball bearing structure 116 is interposed between the sleeve enlargement 42' and the top of the chuck 37. The ball bearing structure 116 prevents the rotating sleeve 42 from turning the chuck 37, the rotation of the bottle by said sleeve 42 thus being prevented. It is understood that the cycle of operations commences at the left hand side of the constantly rotating support 30. The nozzle revolving operation ceases when said support 30 has about completed one-half of a revolution, that is, when the gear 110 leaves the stationary rack 112 whereupon said gear receives another stationary feather 117 to guard against incidental rotation of said gear.

*Cement applying mechanism*

I will first describe the mechanism that is employed to direct the flow of metal cement upon the wire after it has been applied to a bottle cap and the means by which the wire cement is prepared for its application to the wire. The metal cementing substance is received in a pot 119 which is heated by electrical resistance units 120 in close proximity in the pot, as illustrated most clearly in Figs. 12 and 19. The pot is carried by the yoke 121, being positioned upon this yoke by the upright rods 122 on the yoke that pass through eyes 123 formed upon the pot. The yoke 121 is carried by the clamps 121' which are clamped upon two of the rods 16³ in order that the height of the pot may be suited to the level of the bottles being operated upon. The pot carries two nozzles 124 and 125 which are positioned to direct the heated sealing cement upon the wire 73 where this wire crosses, the nozzle 124 supplying a portion of the total sealing cement that is to be applied to the wire and the nozzle 125 supplying the remainder of the sealing cement that is to be applied to the wire, the prefered form of product being illustrated in Figs. 24 and 25. The nozzles are in the form of sleeves having inturned discharge ends where the nozzle orifices 124', 125 are provided. These sleeves enclose plugs 126, 127 which have spiral passages in their outer surfaces as indicated most clearly at 128 in Figs. 13, 14, 16 and 17. A space intervenes between the front or delivery end of each spiral passage and the corresponding discharge orifice. The melted sealing cement whirls in this space in a somewhat solid mass instead of sprayed form so that it will issue through the nozzle orifice in a somewhat solid stream, instead of in a spray. The flow of the melted or fluid cement through the orifices is promoted and directed by the truncated conical or tapering portions upon the front ends of the plugs, one of these conical portions 129 being shown in full lines in Figs. 13, 14, 16 and 17 and the other conical portion 130 being shown in dotted lines in Fig. 14. The nozzle orifices 124', 125' are of narrow elongated form and the nozzle sleeves 124, 125 are mounted in such relatively adjusted positions, in view of the distance the cement must travel between the nozzles and a bottle and in view of the tendency of the cement to whirl or rotate during such travel, that the cement will be applied to the wire in the form of an oval whose major axis is in the plane of the wire, this result being furthered by the cooperation of the truncated conical portions 129 and 130 as they are related to the nozzle orifices. The cement pot 119 has a revolving bottom 131 coaxial with the pot. This bottom is fixed upon the turns with an upright shaft 132 which is journalled upon bearings 133 carried by the bracket 134 which, in turn, is carried by the yoke 121. The shaft 132 carries a collar 135 which is pressed upwardly by a spring 136 which surrounds the shaft, the lower end of this spring being bottomed upon the lower one of the two bearings 133. The spring thus serves automatically to compensate for any wear upon the top of the bottom of the pot. The bracket 134 and yoke 121 have tongue and groove engagement whereby the tension of the spring may be adjusted. A ratchet wheel 137 is fixed upon and is coaxial with the pot bottom 131. The upper surface of the pot bottom is formed with radial grooves in the form of pockets 138, there being as many such pockets 138 as there are teeth upon the ratchet wheel 137. These pockets are normally uncovered so as to receive cement from the pot. Two of the pockets are, at a time, covered by the closures 139 formed upon the interior of the pot and, when any two pockets are thus covered, they communicate at their outer ends with the outlets 140 in the pot, which outlets are in communication with the spiral grooves 128 in the aforesaid plugs 127. The inner ends of the pockets that are covered by the closures 139 are in communication with the air passages 141 and 142 to which air is supplied under pressure from the pipes 143 and 144 that convey air from the pressure tank 145.

By mechanism which will be presently described, the air is first directed through the pipe 143 and the nozzle 124 to furnish a part of the cement for the overlying wire whereafter the air is directed through the pipe 144 and is cut off from the pipe 143, the air passing through pipe 144 directing the remainder of the cement that is to be applied upon the wire. After the two pockets that are covered by the closures 139 are thus emptied, the ratchet wheel 137 is turned another step, in the next cycle of operations, to replace the two filled pockets in their association with the nozzles and the air pipes.

The preferred form of mechanism for operating the ratchet wheel and for regulating the flow of air through the pipes 143, 144 will now be described. This mechanism includes a master cam 146 which serves to operate the mechanism, this master cam being provided upon the yoke 68, vertically movable in the manner hitherto described, whereby it is lowered to an operative position if there is a corresponding bottle in place and is held raised from this operative position if there is no corresponding bottle in place so that, in the latter event, no cement will be blown during the complete revolution of the support 30 that occurs during the operation cycle pertaining to such revolution which is rendered incomplete due to the absence of the bottle. When the yoke 68 has been lowered as a consequence of the presence of a bottle on the table section 9 beneath it, the master cam 146 is lowered into the zone of the cam rollers 147 and 148 upon the lever 149 which is secured between its ends to the pin 150 that is journaled in bearings 151 carried by the bracket 152. This bracket is secured upon the rods 122 by the set bolts 153 and is also secured upon two of the rods 16³ by means of clamps which are similar to clamps 121'. As will hereinafter appear, when the master cam 146 engages the cam rollers 147, it turns the lever 149 clockwise to turn the ratchet wheel 137 a tooth space and to admit cement ejecting air to the pipe 143.

When the master cam 146 operates upon the cam roller 148, the lever 149 is turned counter-clockwise to admit cement ejecting air to the pipe 144, the ratchet wheel 137 then being held stationary by the action of the spring 136.

The end of the lever 149 which is adjacent the cam roller 148 is connected by means of a link 154 with one end of the lever arm 155 whose other end is secured to the shaft 156 which is journaled in the bearing 157 formed upon bracket 152 and the bearing 158 upon the support 159 which also carries the cement pot 119, this pot being bolted to the support by the bolts 160. The support 159 is also secured to the rods 122 by means of the set bolts 161. Another lever arm 162 is also fixed upon the shaft 156. As the gear 110 is about leaving the rack 112, the cam 146 is brought into engagement with the roller 147 to place the parts in the position shown by full lines in Fig. 11 and as illustrated in Fig. 12. When the parts are being placed in this position, the lever 162 is turned in a clockwise direction whereby the rod 163, which is pivotally connected to an extension 162' of the lever 162, is pulled upon to draw the flange 164 upon said rod 163 against one end of the spring 165 whose other end is bottomed upon the arm 166 that is integrally formed with a bell crank lever 167 which is journaled at its elbow upon the shaft 156. The lever 167 is thus moved through the intermediation of the spring 165, in a clockwise direction, whereby the actuating pawl 168 operates upon the ratchet wheel 137 to move this wheel a tooth space whereby the cement receiving pockets 138 that were emptied upon the previous cycle of operations are moved from their connections with nozzles 124, 125 and the pipes 143 and 144 and whereby the succeeding pockets, which are filled with hot metallic cement, are placed in connection with said nozzles and pipes in substitution for the emptied pockets. The pawl is held in engagement with the ratchet wheel by the spring 169 which is connected at one end with the pawl and at the other end with lever 167. The bell crank lever 167 should be limited to a normally fixed range of arcuate movement in order that the ratchet wheel may be turned exactly one tooth space each time it is operated by the pawl so that the cement holding pockets that are newly brought into connection with the nozzles and the pipes are accurately positioned.

To this end, the lever 167 is provided with an abutment post 170 which engages the fixed abutment 171 upon the support 159. The post 170 is desirably in the form of a bolt in order that it may be adjusted. After the ratchet wheel 137 has thus been turned to a new position, the lever 162 continues its clockwise movement, being permitted so to do by means of the spring 165 which thus constitutes a yielding coupling between the levers 162 and 167. Following the positioning of the ratchet wheel to its new position for the purpose stated, a valve 172 is opened, this valve being included in the pipe 143 that supplies cement ejecting air under pressure from the tank 145 to the cement holding pocket that is in communication with the nozzle 124. This valve is inclusive of a spring 173 which constrains the valve to a closed position and the stem 174 which is engageable by a post 175 carried by the outer end of the lever arm 162. As hitherto stated, the valve is opened after the ratchet wheel has been moved to its new position, the engagement of the post 175 with the valve stem 174 occurring after this turning movement of said wheel. During the initial portion of the engagement of the gear 110, employed in the cycle under description, with the feather 117, the cement supplied to the wire where lapped or crossed upon the cap skirt is allowed to cool. A little later and still during the engagement of said gear 110 with said feather 117, the valve 176, which is included in the pipe 144, is opened to permit air under pressure to pass through this pipe to eject cement through the nozzle 125 upon the patch of cement previously applied to the wire through the nozzle 124. The lever 162 is moved counter-clockwise to release the valve 172 and open the valve 176 by the cam 146 when this cam reaches and operatively engages the cam roller 148.

The mechanism of valve 176 is similar to the mechanism of valve 172, there being a spring 177 which constrains the valve 176 to a closed position, the valve 176 having a stem 178 which is engageable by a post 179 upon the lever 162 when this lever is moved counter-clockwise as stated. The posts 175 and 179 are adjustable in order to secure proper timing in the operation of the valves. The master cam 146 escapes the cam roller 148 while the gear 110 employed in the cycle being described is still in engagement with the feather 117, the spring 177 then being permitted to close the valve 176. While the aforesaid gear 110 is still in engagement with the feather 117, the second portion of cement that was applied to the wire has time to cool. The cap skirt desirably has nothing upon it except the wire that surrounds it and the cement which is allowed to spread upon the cap skirt so that the cement not only serves to cement the lapping or crossing portions of the wire together but also to secure the wire to the cap so that the wire may not be shifted with respect to the cap without detection. I do not wish to be limited to the cementing of lapping portions of the wire to each other since it is obvious that the wire may be cemented to the cap skirt without having lapping or crossing portions of the wire cemented to each other.

*Sealing element severing mechanism—Figures 21 to 23 and others*

The mechanism for severing the wire is inclusive of a normally stationary knife 180 and a swinging knife 181, these two knives together constituting a pair of shears. Both knives are carried upon the post 182 which is provided upon the end of a lever 183 which is journaled upon a shaft 184 carried upon a bracket 185 which is carried by a yoke 186. This yoke is carried by clamps 187 that are clamped upon two of the bars 16³ whereby the shears may be adjusted vertically to suit the adjustment of the other parts that are made to suit the bottles being operated upon. The knife 181 is a part of a bell crank which is journaled at its elbow 188 upon the post 182. The end of the bell crank which is opposite the end where the knife 181 is formed moves between two stops 189 and 190 which are provided upon and within the hollow carrier 191 which is secured upon the yoke 186. When the support 30 turns sufficiently, the arm of the knife 181 between the stops 189, 190 is moved into contact with the stop 189 with the result that the knife 181 is rotated on its pivot 188 and thus caused to cooperate with the stationary knife 180 to sever the wire which is received between the two knives. When the wire has been severed, the aforesaid arm of knife 181 is moved into contact with stop 190, causing knife 181 to swing away from knife 180. The two knives are normally withdrawn from the path of the wire and are positioned to receive the wire between them when the wire is to be cut. To this end, the lever 183 which carries the knives is controlled by the spaced apart cams 192 and 193, these cams being provided upon the rotating support 30. The cam 192 first engages the cam extension 194 of the lever 183 to swing the knives into a position in which the wire will be between them whereupon the knives are brought together in the manner described and as illustrated in Figs. 22 and 23. When the wire has been cut, the knives are together moved to their outer position away from the wire, the lever 183 being suitably swung for this purpose by the cam 193 which engages the cam 195 fixedly upon the shaft 184 upon which the lever 183 is fixed.

Very shortly after the knives have been withdrawn, the gear 110 leaves the feather 117 whereupon this gear engages the arcuate segmental gear rack 196 which is carried by the gear carrier 59⁴ and is in the same plane with the rack 112. During this engagement of the gear 110 with the rack 196, the nozzle is turned a half revolution to bring the end of the wire projecting from the nozzle between the clamping members 92, 93, whereupon this wire end is clamped in the manner hitherto described, this clamping operation occurring upon the initiation of the next cycle. After the wire cutting operation and before this clamping of the wire is effected, the table section 9 carrying the bottle operated upon is lowered and the bottle is discharged from the machine, this discharge of the bottle being the conclusion of the cycle of operations under description. This bottle is discharged by one of the teeth of the star wheel 197 which star wheel is secured to the table 10. The tooth of the star wheel that engages this bottle forces the bottle to leave the table 10 and causes the bottle to enter the chute 198 that directs the bottle upon the deck 2 from which the bottle may be moved by an attendant.

*Wire sealing machine—Figures 27 to 43—parts also common to Figures 1 to 26*

Where the material used by the machine of my invention for forming a fastening around the skirts of the closure caps, is a binder of metal, that is wire already coated with a suitable metallic cement, certain principles of the machine described above are employed. The general details and arrangements of the bottle positioner, bottle "chucking" mechanism, the revolving table 10 and allied mechanism, the strand winding mechanism, wire or strand severing mechanism, and other parts of this embodiment illustrated in Figs. 27 to 43, each inclusive, are similar to those shown in Figs. 1 to 10 as well as Figs. 21 to 23 inclusive and described above. A change however is required in the clamping member 92′ as shown in Figs. 31 and 32 which is pivoted at 94 upon a bracket 95 that is carried by the guide 38. Said clamping member is formed with a slot 96 which receives the spherical end of a lever 97′ which is intermediately journalled upon a shaft 98 that is itself journaled in bearings 99, 100 carried by the brackets 47 and 39 respectively.

The operation of the clamping member 92′ through the lever 97′ is otherwise the same as already described with respect to the string, the operation of the clamp being effective during the rotation of the nozzle and until after the overlapping ring or wire portions are cemented together and the cement or solder hardened. The wire is severed at the wire nozzle just before the clamping member 92' is released. When the wire nozzle has been turned one and one-half times about the bottle neck the fluxing device is brought into operation as will later appear.

*Cement sealing mechanism Figures 33 to 39 and others*

My mechanism which will be presently described, the lapping or crossing portions of the wire that has been passed about a bottle cap are soldered together, this soldering operation occurring during the initial portion of the engagement of the gear 110 with the feather 117, the cooling of the solder occurring during an ensuing portion of this engagement and the severing of the wire at the wire nozzle occurring during the concluding portion of such engagement as will hereinafter appear.

The cement employed in the mechanism of Figures 1 to 25 may be wax if string is employed and is desirably one which will fuse in response to heat and is desirably in the nature of solder, as indicated at 118. In the wire sealing machine, especially illustrated in Figs. 26 to 43, the string is preferably metallic, particularly if the cement is in the nature of solder. The solder is desirably present upon and about the wire before the wire is employed in the machine. That is, the wire is so-called tinned wire and is supplied as such from the reels 75. The invention is not to be thus limited, however, nor is to be limited to the soldering or cementing of lapping ring portions nor to the lapping ring portions. By the winding mechanism which has been described, the wire is closely wrapped about the cap skirt about one and one-fifth times the circumference of the cap skirt so that there is provided a cap contracting ring having mutually lapping portions, Fig. 43, it being these mutually lapping portions that are soldered together by fluxing the solder that is on the wire and allowing the solder to cool to hold said lapping portions in ring contracting relation. The wire of the ring is continued beyond the soldered together mutually lapping portions of the ring so that the wire may be grasped, where unattached, to tear the mutually lapping portions of the ring apart when access is to be had to the bottle.

Where the cement is fluxed by heat and the heat is furnished by an electric current, I employ two contacts 200, 201 which project from metallic spring barrels 202, 203, these contacts being inwardly pressed toward the wire by springs 204 within said spring barrels. The spring barrels slide within insulating sleeves 205, 206 which are carried by and are in fixed relation to the guide 38, Fig. 34. The sleeves 205 and 206 are desirably so positioned that the contacts 200 and 201 are at the ends of the lapping portions of the wire ring that are to be soldered together. Current is passed through the circuit that includes the spring barrels 202, and 203 and the contacts 200 and 201 from the battery 207, mechanism being provided for withdrawing the contacts from engagement with the wire when the circuit has endured sufficiently long to melt the solder in order that the solder may be allowed to cool, these results occurring while the gear 110 still engages the feather 113. The mechanism for thus controlling the circuit is desirably inclusive of two arcuate contact bars 208 and 209 which are assembled by bolts 210 which pass through circular openings in bar 209 and the arcuate opening 211 in bar 208. These bars are suitably insulated from the bolts by means of the insulating sleeves 212 and the insulating washers 213, the sleeves 212 being shouldered to receive the bar 209, the reduced ends of these sleeves passing through the circular holes in this bar. The two bars may be relatively adjustable longitudinally of each other to regulate their aggregate length, the two bars being thus in effect a bar whose effected length is adjustable.

The mechanism for controlling the circuit is also inclusive of a single bar 214 (Figs. 34 and 37) which is mounted upon a yoke 215 by the aforesaid bolts 210. This yoke is carried by clamps 216 that are clamped to two of the rods 16³. By means of these clamps, the yoke 215 may be adjusted vertically to suit other adjustments that are made according to the size of the bottles being operated upon. The bars 208 and 209 are also carried by the yoke 215 through the intermediation of the insulating sleeves 212 which have other reduced ends that are received in circular holes in the bar 214. The bolts 210 after passing through the sleeves 212 pass through insulating washers 217, and are screwed into the cam extension 218 of the yoke 215. The bars are thus insulated from the yoke 215 and the bar 214 is likewise thus insulated from bars 208, 209, the latter two bars being in electrical connection. An additional bolt 219 may be employed for directly assembling the far end of the bar 214 with the yoke, this bar 219 being insulated from the yoke 215. The spring barrels 202, 203 are provided with shanks 220 of reduced diameter, these shanks being received in insulating sleeves 221 that are provided in the cross head 222. The spring barrels are clamped in assembly with the cross head by means of nuts 223 which are screwed upon the outer threaded ends of the shanks of spring barrels. Wipers 224 and 225 are clamped into electrical and mechanical assembly with the spring barrels by means of nuts 226 that are also screwed upon the threaded ends of the shanks of spring barrels. The wiper 224 has sliding contact with the arcuate contact bar 214. The wiper 225 has sliding contact with the arcuate contact bars 208, 209. A cam roller 227 is carried by the cross head 222 and is adapted to ride upon the cam 218. During the initial portion of the engagement of the gear 110 with the feather 117, the cam roller 227 is in engagement with the cam 218, to press the cross head inwardly to engage the contacts with the wire. Current from a battery opposed by the resistance of the wire and its solder causes sufficient heat to melt the solder which fluxes where the wire laps. The duration of the circuit is adjusted by relatively adjusting the two bars 208, 209, as will be apparent. When the contact wiper 225 leaves the contact bar 208, the circuit is opened. The contacts are also separated at this time, a result which is accomplished by means of the spring 228 that surrounds the post 229 which is screwed into the guide 38 and which has a head upon its outer end against which the spring thrusts the cross head when the cam roller 220 has left the cam 218.

After the circuit is opened, the gear 110 continues in engagement with the feather 117, the solder cooling after the circuit is opened. After the cooling of the solder has been completed which occurs near the termination of the engagement of the gear 110 and the feather 117, the wire is severed at the nozzle while still under tension between the wire nozzle and the clamp 92, 93.

The mechanism for severing the wire has already been described above in connection with Figures 1 to 25 and requires no further specific description. In like manner the movement of the wire nozzle for a half revolution to bring the end of the wire projecting from the wire nozzle between the clamping members 92, 93 occurs through the engagement of gear 110 with the rack 196 and thus prepares for a subsequent cycle of operation as has already been described.

This application is a division of my co-pending application Serial No. 683,649 as filed August 4, 1933.

In so far as the subject matter of this application is concerned, the same is found embodied in my said prior application Serial No. 683,649 and also in my prior applications Serial No. 497,918 filed November 24, 1930 and Serial No. 123,938 filed July 21, 1926.

What I claim is:

1. In a machine the combination with a rotary carrier having a plurality of positioning means for bottles each adapted to receive a contractible skirted cap thereon, said cap adapted to be held thereon by a band; means for supporting a spool of strand material constituting a source from which a band may be supplied for each bottle cap; mechanism associated with each positioner for applying a band to a bottle cap whereby the cap skirt is folded and constricted on the bottle neck, causing the band to be held taut, and forming a destructible joint to seal the skirted cap to the bottle; means whereby the band applying and sealing mechanism is controlled by the presence or absence of a bottle to be sealed; mechanism constructed to sever said band from said source of supply on said spool; means to continuously rotate said carrier and the plurality of bottle positioners; and means for causing relative movement between each positioner and the corresponding mechanisms in the operation of said combination.

2. In a machine, the combination with a rotary table having a plurality of separate positioning means each adapted to receive a bottle with a contractible skirted cap located thereon, said cap adapted to be held thereon by a band; a plurality of supports for spools of strand material each one constituting a source of strand supply for the capped bottle on said corresponding positioner; mechanism withdrawing a section of strand material to form a band for each bottle cap, applying the band to the cap so that the skirt is folded and constricted on the bottle neck, holding said band in pressing contact with said skirt, and sealing said skirted cap on the bottle, said strand withdrawing means for each positioner rendered ineffective in the absence of a bottle from said bottle positioner; mechanism constructed to sever from said source of supply the section of strand material constituting the band surrounding the cap skirt on said bottle; means to continuously rotate said rotary table and positioners; and means for causing relative movement between each bottle positioning means and said mechanism in the operation of said combination.

3. In a machine, the combination with a rotary carrier having a plurality of positioning means for a bottle each adapted to receive a contractable skirted cap thereon, said cap adapted to be held thereon by a band; means for supporting a spool of strand material constituting a source of band supply for each bottle cap; mechanism associated with each positioner for withdrawing a band section of said strand material from said spool, applying said band around the bottle cap on each bottle in sealing position thus folding the cap skirt in constricted relation on the bottle neck, causing the band to be held taut, and forming a destructible joint to seal the skirted cap to the bottle; means whereby the band withdrawing, applying and sealing mechanism is controlled by the presence or absence of a bottle to be sealed; mechanism constructed to sever said band from the section of material forming the band supply for each bottle having a bottle cap thereon; means to continuously rotate said carrier and the plurality of bottle positioners; and means for causing relative movement between each positioner and the corresponding mechanisms in the operation of said combination.

4. In a machine, the combination of a central main driving shaft; a rotatable carrier driven by said shaft and having a plurality of positioning means for bottles, each adapted to receive a contractible skirted cap thereon, said cap adapted to be held thereon by a band; a rotary head adjustable with respect to said carrier for accommodating bottles of varying sizes said head being driven by said shaft and supporting a plurality of individual bottle cap sealing means each including a support for a spool of wire constituting a source of supply for the band for the capped bottle on one positioner; a plurality of means, one associated with each positioner, for withdrawing a band section of said wire from said spool, applying the same to a bottle whereby the cap skirt is folded and constricted on the bottle neck, causing the band to be held taut, and forming a destructible joint to seal the skirted cap to the bottle, means whereby the band applying and sealing means is controlled by the presence or absence of a bottle to be sealed; mechanism constructed to sever the band from said section of wire forming the supply for each capped bottle; means to continuously rotate said carrier and the plurality of bottle positioners; and means for causing relative movement between each positioner and the corresponding mechanisms in the operation of said combination.

5. In a machine, the combination with a rotary carrier having a plurality of positioning means for bottles, each bottle having a beaded mouth portion and adapted to receive a contractible skirted cap thereon, said cap adapted to be held thereon by a band; a support for a spool of wire constituting a source of supply for a band for a bottle cap; mechanism associated with each positioner for applying a band to each capped bottle whereby the cap skirt is folded and constricted on the bottle neck, causing the band to be held taut, and forming a destructible joint to seal the skirted cap to the bottle, said joint being many times longer than the width thereof, whereby the same resists destruction longitudinally of the wire but permits destruction of the joint by movement of one of said portions transversely with respect to the other; means whereby the band applying and sealing mechanism is controlled by the presence or absence of a bottle to be sealed; mechanism constructed to sever a band from the material forming the supply for each sealed bottle; means to continuously rotate said carrier and the plurality of bottle positioners; and means for causing relative movement between each positioner and the corresponding mechanisms in the operation of said combination.

6. In a machine, the combination with a rotary table having a plurality of separate positioning means each adapted to receive a bottle with a contractible skirted closure located thereon, said cap adapted to be held thereon by a band; supports for a plurality of spools of strand material, each spool constituting a source of supply for the bottle on one of said positioners; means to hold said cap in place on the mouth of the capped bottle, mechanism withdrawing a section of strand material from a spool to form a band for each closure cap, said mechanism including means inclusive of a nozzle mounted to turn about the cap skirt and through which the strand is fed and arranged to apply the strand about the skirt, and a holder for engaging the leading or free end of the strand, said nozzle and holder cooperating to cause the cap skirt to be folded and constricted on the bottle neck by said band holding said band taut and in pressing contact with said skirt, mechanism constructed to seal the band thereby securing the skirted cap to the bottle, mechanism constructed to sever the strand at the nozzle and disengage the strand at said holder; mechanism constructed to restore the nozzle to its starting position; said strand withdrawing, sealing and severing means for each positioner rendered ineffective in the absence of a bottle on said corresponding bottle positioner; means to continuously rotate said rotary table and positioners; means for causing relative movement between each bottle positioning means and said mechanism in the operation of said combination, said mechanisms being relatively adjustable to accommodate bottles of varying sizes.

OLOF N. TEVANDER.